US009979006B2

(12) United States Patent
Jin

(10) Patent No.: US 9,979,006 B2
(45) Date of Patent: May 22, 2018

(54) BATTERY PACK INCLUDING DRAINAGE SYSTEM HAVING FLOATING BODY TO CLOSE DRAINAGE HOLE

(71) Applicant: SK INNOVATION CO., LTD., Seoul (KR)

(72) Inventor: Ye Jin Jin, Daejeon (KR)

(73) Assignee: SK INNOVATION CO., LTD., Seoul (KR)

( * ) Notice: Subject to any disclaimer, the term of this patent is extended or adjusted under 35 U.S.C. 154(b) by 278 days.

(21) Appl. No.: 14/360,041

(22) PCT Filed: Nov. 19, 2012

(86) PCT No.: PCT/KR2012/009791
§ 371 (c)(1),
(2) Date: May 22, 2014

(87) PCT Pub. No.: WO2013/077604
PCT Pub. Date: May 30, 2013

(65) Prior Publication Data
US 2014/0335388 A1 Nov. 13, 2014

(30) Foreign Application Priority Data

Nov. 23, 2011 (KR) .................. 10-2011-0122594

(51) Int. Cl.
*H01M 2/10* (2006.01)
*H01M 2/36* (2006.01)
*B60K 1/04* (2006.01)

(52) U.S. Cl.
CPC ........... *H01M 2/36* (2013.01); *H01M 2/1077* (2013.01); *H01M 2/1083* (2013.01); *B60K 1/04* (2013.01); *H01M 2220/20* (2013.01)

(58) Field of Classification Search
CPC ..... H01M 2/1077; H01M 2/1083; H01M 2/36
(Continued)

(56) References Cited

U.S. PATENT DOCUMENTS 4,905,726 A * 3/1990 Kasugai ........... B60K 15/03519
137/202
2001/0000578 A1 * 5/2001 Chau ...................... B60S 1/481
137/260

(Continued)

FOREIGN PATENT DOCUMENTS

CN 201112471 9/2008
CN 102067353 5/2011

(Continued)

OTHER PUBLICATIONS

Kamata, T., Machine translation of JP 2011-173447 A, Sep. 2011.*

(Continued)

*Primary Examiner* — Sean P Cullen
(74) *Attorney, Agent, or Firm* — IP & T Group LLP

(57) ABSTRACT

Provided is a battery pack including a drainage system capable of efficiently discharging water collected inside the battery pack using buoyancy, preventing moisture permeation from the outside, and being implemented in a simple structure to maximize economical feasibility. The battery pack includes a battery pack case having a battery pack embedded therein and having a drainage hole formed in one side thereof; and a drainage system including a body provided to be concatenated with one side of the battery pack case of a position corresponding to the drainage hole and a floating body accommodated in the body and elevated by an introduced fluid to close the drainage hole.

1 Claim, 3 Drawing Sheets

(58) Field of Classification Search
USPC .................................................. 429/61, 82
See application file for complete search history.

(56) References Cited

U.S. PATENT DOCUMENTS

| 2006/0192168 A1* | 8/2006 | Thompson | F16K 15/04 |
| | | | 251/318 |
| 2011/0135978 A1* | 6/2011 | Wiegmann | H01M 2/1072 |
| | | | 429/82 |

FOREIGN PATENT DOCUMENTS

| GB | 399061 A | * | 9/1933 | ............ H01M 2/362 |
| JP | 1995030413 | | 7/1995 | |
| JP | 2004311222 | | 11/2004 | |
| JP | 2008059772 | | 3/2008 | |
| JP | 04166513 | | 8/2008 | |
| JP | 2011173447 | | 9/2011 | |
| KR | 2007103890 A | * | 10/2007 | ............. H01M 2/10 |
| KR | 1020110017591 | | 2/2011 | |
| KR | 1020110023224 | | 3/2011 | |
| KR | 1020110075542 | | 7/2011 | |

OTHER PUBLICATIONS

Choi et al., Machine translation of KR 2007-103890 A, Oct. 2007.*
International Search Report—PCT/KR2012/009791 dated Mar. 4, 2013.

* cited by examiner (A)

(B)

BATTERY PACK INCLUDING DRAINAGE SYSTEM HAVING FLOATING BODY TO CLOSE DRAINAGE HOLE

TECHNICAL FIELD

The present invention relates to a battery pack, and more particularly, to a battery pack including a drainage system capable of efficiently performing drainage and also preventing water permeation into an interior of the battery pack from the outside.

BACKGROUND ART

In accordance with a recent automobile technology, in order to decrease an amount of use of a fossil fuel, a research into an environment-friendly field using electricity as a power source has been gradually increased. As a result of the above mentioned research, an electric automobile only using electricity as the power source, a hybrid automobile appropriately using the fossil fuel and electricity together with each other, and the like have been commercialized. The above-mentioned electric automobile or hybrid automobile is generally provided with a battery such as a secondary battery as the power source for stably supplying electricity.

The battery generally produces power using an electrochemical reaction and includes a cell in which an actual reaction takes place, a case having a plurality of cells stacked therein and supporting the plurality of cells, and the like. Particularly, in order to use the above-mentioned battery in the automobile, high capacity is required. Therefore, the battery which is packaged by gathering a plurality of unit cells and formed in a form of a high capacity battery pack has been widely used for the automobile.

Meanwhile, in most cases, since the automobile is parked outside, it has a very large change range of its usage condition, for example, it is largely affected by a change between winter and summer seasons, a change between day and light, a weather change, and the like, heating values from the respective components are significantly changed according to driving conditions such as when the automobile is being driven and is stopped, and the like. As a result, phenomenon that moisture such as rainwater is permeated into an interior of the automobile, the moisture is condensed and formed at any portion inside the automobile, or the like is necessarily caused. It is apparent in most machinery that the moisture adversely affects lifespan of many parts, operation flexibility of an apparatus, and the like. Particularly, since the battery pack is a part directly producing power, it has a problem that power production efficiency is decreased when the moisture is permeated and further problem of electrical shot possibility, or the like.

As described above, dangerousness caused by the moisture in the battery pack is very significant. However, because of the usage conditions changed depending on an external environment, an automobile driving condition, or the like as described above, it may not be excluded that the moisture is unavoidably formed in the battery pack. Therefore, the battery pack is generally provided with a drainage system for draining the moisture collected inside the battery pack by being produced from the interior of the battery pack or being introduced from the outside.

A drainage system of the battery pack which is widely used according to the related art has a hole formed in a bottom surface of a case of the battery pack and a cap inserted into the hole from the outside of the bottom surface of the case of the battery pack. In this case, the cap is formed to be connected to a bottom surface of the automobile by a spring and receives force pushed by elastic force of the spring to thereby be stably inserted and supported into the hole. In this case, in the case in which the bottom of the battery pack is filled with water to some degree, weight of water becomes large the elastic force of the spring, such that the cap is pushed. As a result, if the hole is opened, then the water collected on the bottom of the battery pack may be discharged through the hole.

However, in a case of the drainage system according to the related art as described above, there was a problem that in the case in which the water of a predetermined amount or more is not collected on the bottom of the battery pack, the drainage is not performed. As such, even in a case of a small amount of water, that is, even if the amount is a small amount enough not to contact a battery system inside the battery pack, if the small amount of water is collected on the bottom of the battery pack, the water may be sloshed due to vibration and impact by the automobile driving and adversely affect the battery system.

Several technologies for easily performing the drainage in a cell field have been disclosed. Particularly, technologies enabling the drainage to be performed by several structures using buoyancy have been variously disclosed in Korean Patent Laid-Open Publication No. 2011-0075542 entitled "Water-Trap Apparatus of Fuel Cell System", Korean Patent Laid-Open Publication No. 2011-0023224 entitled "Water Trap Device of Fuel Cell System", Korean Patent Laid-Open Publication No. 2011-0017591 entitled "Water Drain Device for Exhaust Manifold of Fuel Cell System", and the like. However, because the related arts as described above also have a structure in which the drainage may be performed only in the case in which the water of a predetermined amount or more is collected, they do not at all solve the problems of the drainage system of the battery pack according to the related art as described above. In addition, the apparatus of the above-mentioned related arts has a large volume of the drainage system itself, many numbers of components, a complex structure, and the like as compared to the drainage system of the battery pack according to the related art, such that an installation position thereof may be limited and production cost may be expensive.

RELATED ART DOCUMENT

Patent Document

1. Korean Patent Laid-Open Publication No. 2011-0075542 entitled "Water-Trap Apparatus of Fuel Cell System"

2. Korean Patent Laid-Open Publication No. 2011-0023224 entitled "Water Trap Device of Fuel Cell System"

3. Korean Patent Laid-Open Publication No. 2011-0017591 entitled "Water Drain Device for Exhaust Manifold of Fuel Cell System"

DISCLOSURE

Technical Problem

An object of the present invention is to provide a battery pack including a drainage system capable of efficiently draining water collected inside the battery pack using buoyancy and also preventing moisture permeation from the outside. Another object of the present invention is to provide a battery pack including a drainage system capable of being implemented in a simple structure and maximizing economic feasibility.

Technical Solution

In one general aspect, a battery pack includes a battery pack case 500 having a battery pack embedded therein and having a drainage hole 510 formed in one side thereof; and a drainage system 100 including a body 110 provided to be concatenated with one side of the battery pack case 500 of a position corresponding to the drainage hole 510 and a floating body 120 accommodated in the body 110 and elevated by an introduced fluid to close the drainage hole 510.

The body 110 may have an opened one side, wherein the opened one side may be coupled to one side of the battery pack case 500 to close the drainage hole 510, and have one or more holes 111 formed in surfaces other than the opened one side coupled to the battery pack case 500.

The floating body 120 may have an area larger than that of the drainage hole 510 and is made of a material having a density lower than that of water.

The drainage system 100 may further include a guide part 121 guiding a movement of the floating body 120 in the body 110. The guide part 121 may be formed in a form of one or more rods or a wall having a plurality of holes formed therein.

DESCRIPTION OF DRAWINGS

The above and other objects, features and advantages of the present invention will become apparent from the following description of preferred embodiments given in conjunction with the accompanying drawings, in which.

[Detailed Description of Main Elements]

| 100: drainage system | |
|---|---|
| 110: body | 111: hole |
| 120: floating body | 121: guide part |
| 500: battery pack case | 510: drainage hole |

BEST MODE

Hereinafter, a battery pack according to an embodiment of the present invention having a configuration as described above will be described in detail with reference to accompanying drawings.

Figure 1:
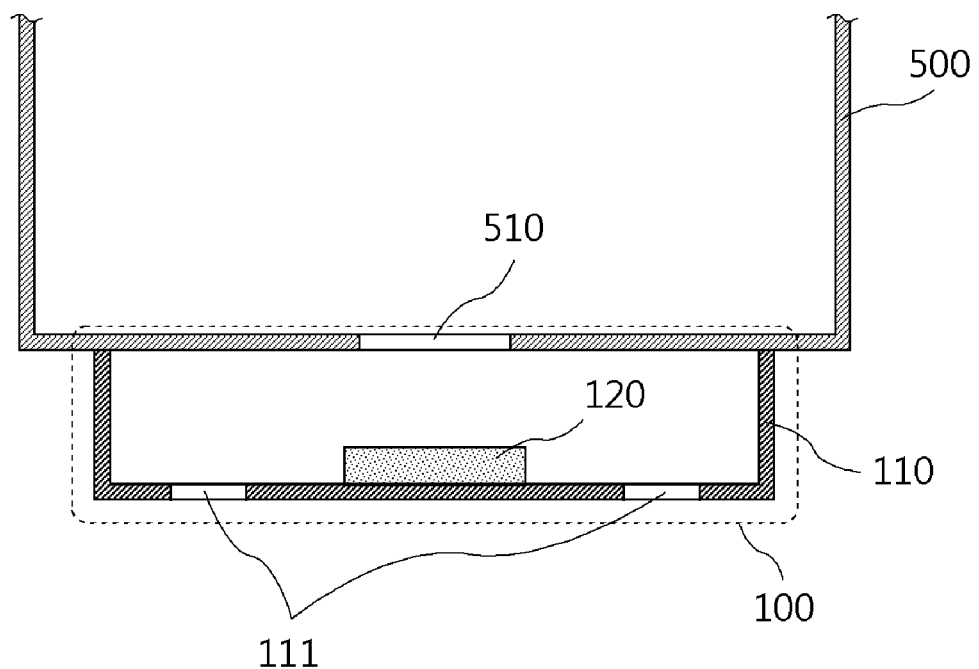
FIG. 1 illustrates an embodiment of a drainage system of a battery pack according to present invention.

FIG. 1 illustrates an embodiment of a drainage system of a battery pack according to the present invention. The drainage system of the battery pack according to the embodiment of the present invention has a very simple configuration including a battery pack case 500 having the battery pack embedded therein and a drainage hole 510 formed in one side thereof; and a drainage system 100 including a body 110 and a floating body 120, as shown in FIG. 1.

The body 110 is provided to be concatenated with one side of the battery pack case 500 of a position corresponding to the drainage hole 510 and is formed so that a fluid may be introduced into inside and outside thereof, as shown. A more detailed description thereof will be provided below. According to the embodiment shown in FIG. 1, the body 110 has one side opened, wherein the opened side is coupled to one side of the battery pack case 500 to close the drainage hole 510. That is, the body 110 having a container shape is provided in a form covering the drainage hole 510. In this case, surfaces of the body 110 other than the opened side coupled to the battery pack case 500 are provided with one or more holes 111. As a result, the fluid may be introduced into the inside and outside of the body 110 through the holes 111.

Although FIG. 1 illustrates a case in which a wall surface of the body 110 is formed in a general plate surface form having several holes 111 punched therein, the form of the body 110 is not limited thereto. For example, the body 110 may have a form such as a form in which the wall surface itself of the body 110 is formed in a mesh structure (that is, a form in which the body 110 itself has the container form formed in a net), or the like, and may be formed in any form as long as moisture may be freely introduced into the inside and outside of the body 110.

The floating body 120 is accommodated inside the body 110 and serves to close the drainage hole 510 by being elevated by the introduced fluid. In this case, it is preferable to form the floating body by a material having a density lower than that of water. Therefore, when the moisture is introduced into the body 110 from the outside, the floating body 120 is elevated by buoyancy. In this case, since the body 110 is installed on a position of the drainage hole 510 of a bottom surface of the battery pack case 500 as described above, the floating body 120 is elevated, thereby making it possible to close the drainage hole 510.

Figure 2:
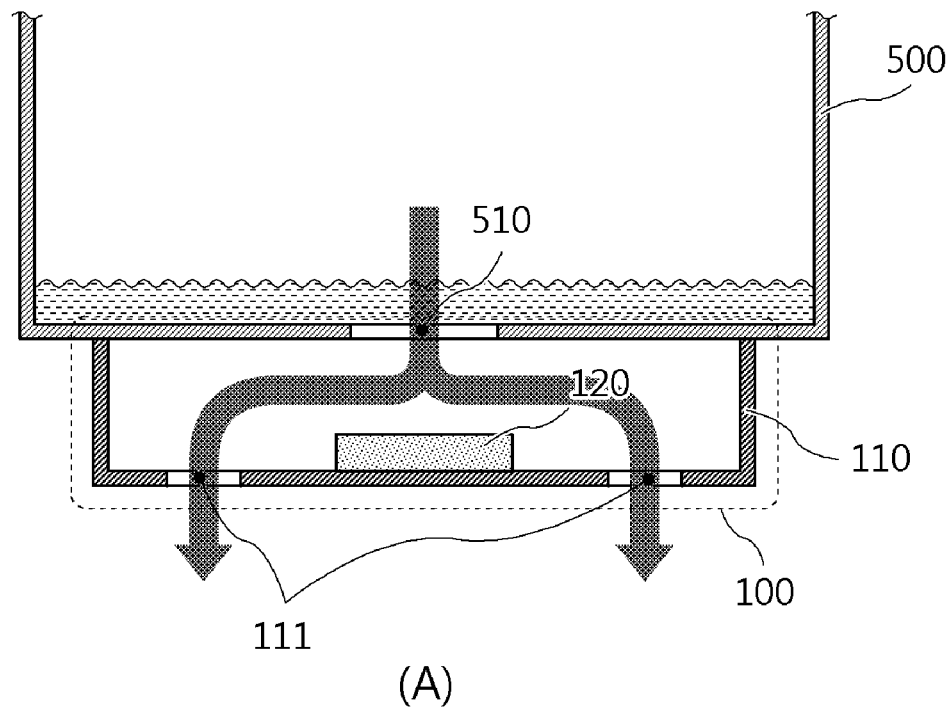
FIG. 2 is an operation state view of an embodiment of a drainage system of a battery pack according to present invention.
Figure 2:
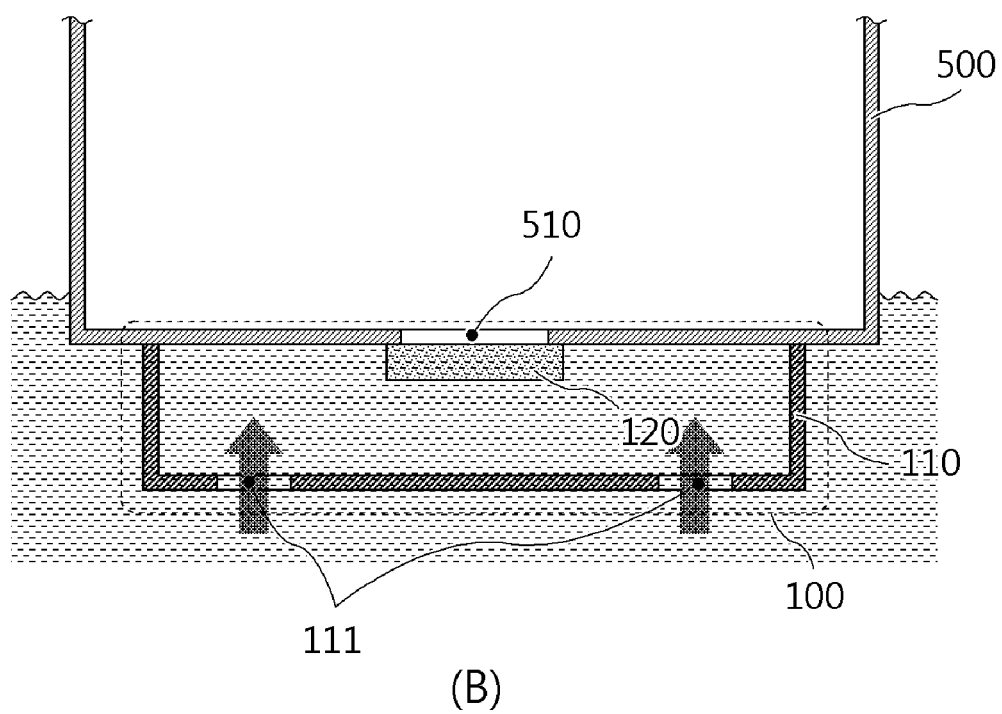

FIG. 2 is an operation state view of an embodiment of a drainage system of a battery pack according to present invention.

As shown in FIG. 2A, in the drainage system 100 according to the embodiment of the present invention, the drainage hole 510 formed in a bottom surface of the battery pack case 500 is always opened in a normal case. As a result, if even a little moisture is collected inside the battery pack case 500, the moisture may be immediately discharged through the drainage hole 510. The moisture discharged through the drainage hole 510 is first transferred to the body 110 of the drainage system 100. Here, since the body 110 may also introduce the moisture into the inside and outside thereof (by having a structure in which the holes 111 are formed in the wall surface thereof, or the like), the moisture may passes through the body 110 and may be immediately discharged and discarded to the outside.

As described above, the related art has a structure in which the moisture may be discharged (by opening the drainage hole when weight of the moisture overcomes elastic force provided to a cap blocking the drainage hole) only in the case in which the moisture of a predetermined amount or more is collected. However, since the present invention has a structure in which the drainage hole 510 is always opened in a normal case, the moisture may be immediately discharged without needing to collect the moisture of the predetermined amount or more, such that the moisture may always not be collected at all in the battery pack case 500. As a result, problems such as electrical short possibility, and the like caused by the moisture left in the battery pack case 500 may be basically solved.

In the case in which the drainage hole 510 is always opened as described above, there is a problem caused when water is filled outside. In the case in which an outside water level becomes higher than a height of the drainage hole 510, if the drainage hole 510 is opened, it is apprehended that the water permeates into the battery pack case 500 through the opened drainage hole 510. However, the present invention may solve the above-mentioned problem by including the floating body 120 inside the body 110. That is, as shown in FIG. 2B, when the outside water level is risen, the floating body 120 is elevated and the drainage hole 510 is closed by the floating body 120, such that the outside moisture is not permeated into the battery pack case 500 through the drainage hole 510.

When the outside water level is dropped, the floating body 120 is also naturally dropped and the drainage hole 510 is then again naturally opened. Therefore, when the outside water level is dropped, the operation state is again returned to a state of FIG. 2A, such that the moisture inside the battery pack case 500 may be immediately discharged.

In this case, it is preferable to form the floating body 120 to have an area larger than that of the drainage hole 510. In the case in which the floating body 120 and the drainage hole 510 have the same area, if the floating body 120 is not accurately inserted into the drainage hole 510 because it floats on water and is rolled, the drainage hole 510 may not be closed, and if the water is also drained in a state in which the drainage hole 510 is closed, the floating body 120 gets jammed in the drainage hole 510 and does not get out the drainage hole 510, such that it is apprehended that the drainage hole 510 may not be returned to the opened state. Therefore, as shown in the drawings, it is preferable to form the floating body 120 to have an area larger than that of the drainage hole 510 to naturally cover and block the drainage hole 510 even though a position of the floating body 120 is slightly rolled when the water lever is risen.

As described above, since the drainage system 100 according to the embodiment of the present invention has a very simple configuration, it may be easily implemented, may be economical, and may simultaneously solve a drainage problem in a normal case and a watertight problem when the outside water level is risen. In addition, since the drainage system 100 according to the embodiment of the present invention may be implemented in a significant flat form, it is hardly limited in installing it, for example, it may be easily installed even in the case a gap between a lower surface of the battery pack case 500 and a bottom of an automobile is significant narrow.

Figure 3:
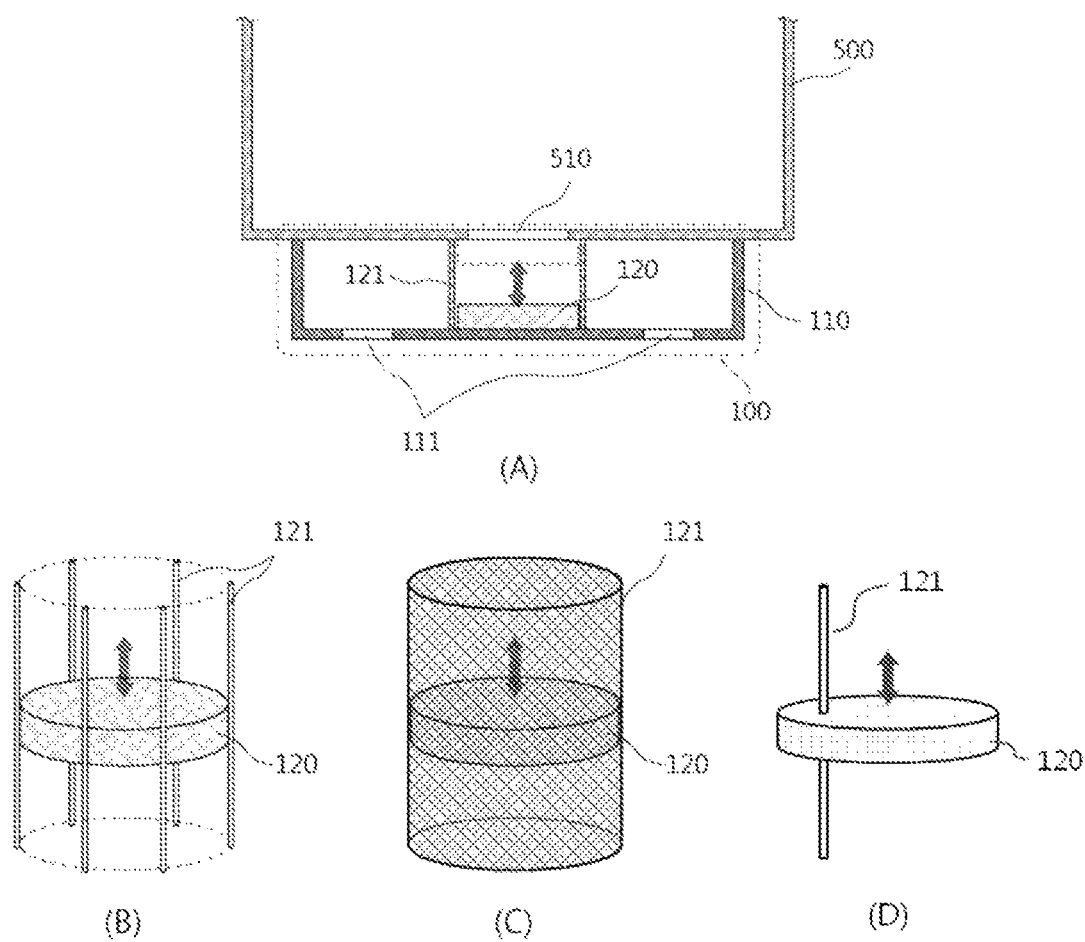
FIG. 3 illustrates another embodiment of a drainage system of a battery pack according to present invention.

FIG. 3 illustrates another embodiment of a drainage system of a battery pack according to present invention. The embodiment shown in FIG. 3 discloses a configuration further including a guide part 121. The guide part 121 is provided inside the body 110 to serve to guide a movement of the floating body 120. More specifically, the guide part 121 is provided to prevent the floating body 120 from being separated from a position corresponding to the drainage hole 510 while being floated and rolled on water when the water level is changed and to allow the floating body 120 to be guided to a normal position.

According to the present invention, because the floating body 120 may need to open or close the drainage hole 510 by being elevated or dropped according to the water level, the guide part 121 is not supposed to prevent the water from being in contacted with the floating body 120. That is, the moisture may need to be freely introduced into the inside and outside of the guide part 121. As described above, in order for the guide part 121 to freely introduce the moisture into the inside and outside thereof and to guide a movement trajectory of the floating body 120, structures shown in FIGS. 3B and 3C may be used.

FIG. 3B illustrates a case in which the guide part 121 is comprised of a plurality of rods and is disposed to surround the floating body 120. As described above, the guide part 121 may be comprised of one or more rods. If the guide part 121 is comprised of a single rod, as illustrated in FIG. 3D the single rod is formed to penetrate through the floating body 120, thereby making it possible to freely move the floating body 120 in a vertical direction and to prevent the floating body 120 from being separated from the normal position. Of course, also in the case in which the guide part 121 is comprised of the plurality of rods, the guide part is not necessarily disposed to surround the floating body 120 as shown in FIG. 3B, but may be formed so that a portion or all thereof penetrate through the floating body 120. In addition, modifications and variations of the drainage system according to the present invention can be made without departing from the spirit and scope of the invention, for example, in the case in which the rods are disposed around the guide part 121 as shown in FIG. 3B, grooves are cut in portions on the floating body 120 in contact with the rods, thereby making it possible to more stably guide the floating body 120.

FIG. 3C illustrates a case in which the guide part 121 is formed of a wall form having a plurality holes formed therein. Similar to the above description of the body 110, in order to freely introduce the moisture into the inside and outside of the guide part 121, the holes may be punched in a general wall surface or the wall surface itself may be formed in a mesh structure. FIG. 3C illustrates a case in which the wall surface itself is formed in the mesh structure.

The present invention is not limited to the above-mentioned exemplary embodiments but may be variously applied, and may be variously modified by those skilled in the art to which the present invention pertains without departing from the gist of the present invention claimed in the claims.

INDUSTRIAL APPLICABILITY

According to the present invention, even if a small amount of moisture is collected inside the battery pack, the moisture may be immediately discharged, thereby allowing the moisture not to be left in the battery pack. As a result, according to the present invention, the problems of the drainage system according to the related art that the drainage may be performed only in the case in which the water of a predetermined amount or more should be collected (e.g., the problems that the water may be sloshed due to vibration and impact by the automobile and adversely affect the battery system, the electrical short may be caused, and so on) may be basically solved. In addition, in the case in which the water is collected in the outside of the battery pack, the drainage hole is formed to be closed by the buoyancy, such that the moisture permeation into the inside of the battery pack from the outside may also be effectively prevented.

In addition, since the drainage system according to the present invention is configured by a very simple structure and a minimum component, it may be very easily implemented and have very inexpensive production cost, such that it is more economical than other drainage systems according to the related art. In addition, since the drainage system according to the present invention may be formed to have a relative smaller volume than other drainage systems according to the related art, it may be easily installed in a portion such as a significant narrow gap, thereby greatly expanding a limited range of the installation position.

The invention claimed is:
1. A battery pack including a drainage system, comprising:
   a battery pack case;
   a drainage hole formed in a bottom side of the battery pack case, water inside the battery pack case being drained through the drainage hole; and
   the drainage system attached to the bottom side of the battery pack case,
   wherein the drainage system comprises: a body having an opened side, the opened side being attached to the bottom side of the battery pack case; a floating body accommodated inside of the body; and one or more holes formed in surfaces other than the opened side of the body, and
   wherein the floating body is configured to float and close the drainage hole when water is introduced inside the drainage system through the one or more holes of the body, and the floating body has an area larger than an area of the drainage hole and is made of a material having a density lower than a density of water,
   wherein the body further includes a guide part including a single rod penetrating the floating body in a vertical direction for guiding a movement of the floating body relatively to the single rod inside the drainage system.

* * * * *